United States Patent
Raz

(10) Patent No.: US 7,251,692 B1
(45) Date of Patent: Jul. 31, 2007

(54) PROCESS TO THWART DENIAL OF SERVICE ATTACKS ON THE INTERNET

(75) Inventor: Danny Raz, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 718 days.

(21) Appl. No.: 09/672,206

(22) Filed: Sep. 28, 2000

(51) Int. Cl.
*G06F 15/16* (2006.01)
*G06F 15/173* (2006.01)

(52) U.S. Cl. .................. 709/225; 709/232; 709/238

(58) Field of Classification Search ............ 709/224, 709/225, 200, 232, 238; 713/200, 201; 370/395
See application file for complete search history.

(56) References Cited

U.S. PATENT DOCUMENTS

| | | | | |
|---|---|---|---|---|
| 5,991,881 | A | * | 11/1999 | Conklin et al. ............ 713/201 |
| 6,487,204 | B1 | * | 11/2002 | Dacier et al. ............. 370/395 |
| 6,578,147 | B1 | * | 6/2003 | Shanklin et al. ........... 713/200 |
| 6,609,205 | B1 | * | 8/2003 | Bernhard et al. .......... 713/201 |
| 2002/0031134 | A1 | * | 3/2002 | Poletto et al. ............ 370/401 |
| 2002/0032871 | A1 | * | 3/2002 | Malan et al. ............. 713/201 |
| 2002/0035698 | A1 | * | 3/2002 | Malan et al. ............. 713/201 |
| 2003/0110394 | A1 | * | 6/2003 | Sharp et al. ............. 713/200 |

OTHER PUBLICATIONS

*The Internet Engineering Task Force* (IETF) RFC 2827, "Network Ingress Filtering: Defeating Denial of Service Attacks which employ IP Source Addresss Spoofing", May 2000, pp. 1-9.

* cited by examiner

*Primary Examiner*—Paul H. Kang

(57) ABSTRACT

Denial of service (CSDoS) attacks are managed by a process that diverts a fraction of SYN packets destined to a server S to a web guard processor. The web guard processor acts as a termination point in the connection with the one or more clients from which the packets originated, and upon the establishment of a first TCP connection with a legitimate client, opens a new TCP connection to the server and transfers the data between these two connections. It also monitors the number of timed-out connections. When an attack is in progress, the number of the forged attack packets and timed-out connections increases significantly. If this number exceeds a predetermined threshold amount, the web guard processor declares that this server is under attack. The switch diverts all traffic (i.e. SYN packets) destined to this server to the web guard processor, or to delete all SYN packets to the server.

7 Claims, 3 Drawing Sheets

PROCESS TO THWART DENIAL OF SERVICE ATTACKS ON THE INTERNET

FIELD OF THE INVENTION

The present invention relates generally to providing security from attacks made on the legitimate operation of computer networks such as the Internet, and, more specifically, to a technique that can reduce the problems that occur when an attempt is made to interfere with the operation of a network by a coordinated denial of service attack.

BACKGROUND OF THE INVENTION

As computer networks and the Internet become more critical for many businesses, guaranteeing the appropriate operation at a reasonable service level becomes a top priority. Allowing business services over the Internet makes the organization's network much more vulnerable to attacks, which may reduce performances or even bring the entire network down. For this reason, network security, and in particular protecting the network against malicious attacks, has also become increasingly significant for many businesses.

One of the most common and dangerous types of attacks is known as the Denial of Service (DoS) attack. DoS attacks are designed to bring down a computer or network by overloading it with a large amount of network traffic using TCP, UDP, or ICMP data packets. On their own, these packets look harmless, making them easily allowed through a company's routers and firewalls. As indicated by its name, DoS attack denies the appropriate service from legitimate customers by overloading both the network and the attacked server.

One specific form of the DoS attack is the Coordinated SYN DoS attack (CSDoS). In this attack, several malicious hosts, working on a coordinated basis and therefore operating essentially simultaneously, send only SYN packets (which are the first packet in the TCP connection establishment protocol) towards an intended victim server, using forged sender IP addresses. In this way, the attacker creates both a very large amount of entries in the victim server's TCP connection table, as well as a very high load on the links that connect that server to the Internet. The use of forged sender IP addresses makes the server send its SYN/ACK packets (which are the TCP reply packets to SYN packets) to non existing addresses, and thus the entries in the connection tables stay until they are timed out. In addition, there is no easy way to find out the addresses of the comprised malicious hosts, thus preventing an effort to filter out packets from these hosts.

RFC 2827 talks about these attacks and suggests ways to block packets with forged sender IP addresses. The manufacturers of layers 4-7 switches[1] promote the use of these devices to filter out unwanted traffic and for load balancing that can be used to alleviate the load from a Network Intrusion Detection (NID) systems. However, these techniques have not been successful because the efficacy of ingress filtering (as described in RFC 2827) and like techniques depends heavily on voluntarily cooperation from every individual network in the Internet. Furthermore, such approaches are costly to operate, and are subject to the negative effects of misconfigured access lists.

[1] There is often some confusion regarding terminology among experts in the field, relating to layer 4 and layer 7 switches. In this specification, "layer 4-7 switches" refers to this type of devices, in general. Where there are differences between layer 4 and layer 7 switches, these differences are pointed out.

SUMMARY OF THE INVENTION

In accordance with one embodiment of the present invention, existing Internet content delivery infrastructure, which includes a network of interconnected programmable layer 4-7 switches, is modified in order to fight coordinated SYN denial of service (CSDoS) attacks. During normal operation, the layer 4-7 switch is arranged to divert a small fraction of SYN packets originating in one or more clients and destined to various servers, to a web guard processor. The web guard processor serves as one terminating end of a first complete TCP connection with the client originating the packet, and, upon the establishment of this first TCP connection, opens a new TCP connection to the server and transfers the data between these two connections. It also monitors the number of timed-out connections to clients of each server. When a CSDoS attack is in progress, the number of the forged attack packets and hence the number of timed-out connections increases significantly. If this number exceeds a predetermined threshold amount, the web guard processor declares that this server is under attack. It then reprograms the switch to divert all traffic (i.e. SYN) destined to this server to the web guard processor, or to delete all SYN packets to the server in question. If the number of timed-out connections increases, it can also inform other web guard processors, and/or try to find the real originating hosts for the forged packets. In either event, the server is thus shielded from, and does not feel the effects of, the DoS attack.

In accordance with another embodiment of the present invention, a network of interconnected layer 4-7 switches is enhanced to improve its ability to thwart CSDoS attacks, by arranging the switches to forward SYN packets to respective TCP proxies that each operate without an associated cache, and are therefore inexpensive to install and operate. These TCP proxies, when subject to a CSDoS attack, will not successfully establish a TCP connection with a malicious host, due to the nature of the attack itself. Accordingly, no connections will be made from the TCP proxies to the server under attack, and the server will be protected.

BRIEF DESCRIPTION OF THE DRAWING

The present invention will be more fully appreciated from a consideration of the following Detailed Description, which should be read in light of the accompanying drawings in which.

DETAILED DECRIPTION

Figure 1:
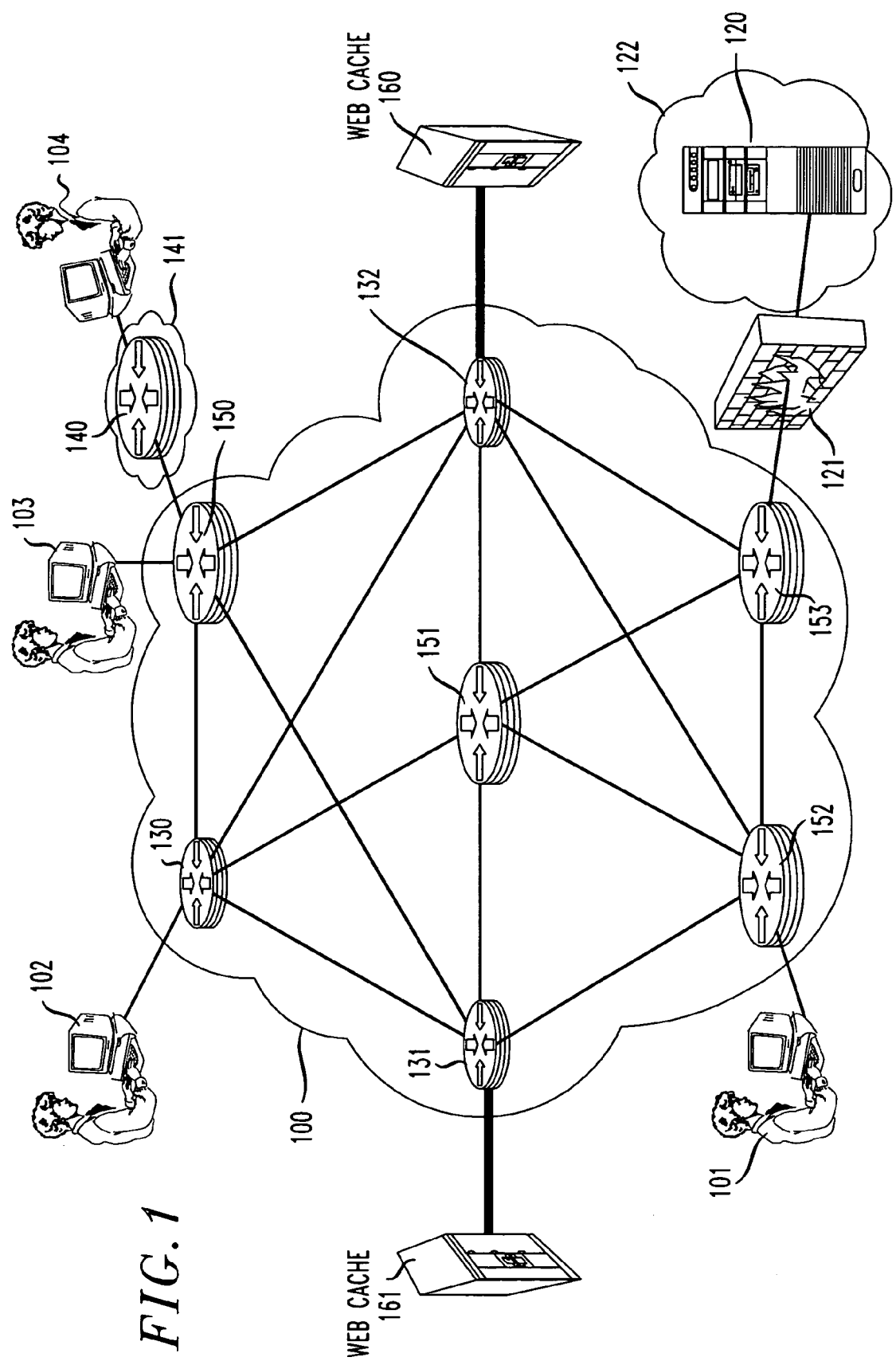
FIG. 1 is a block diagram of the infrastructure elements presently found in the Internet.

In order to put the present invention in the appropriate context, it will be helpful to first review the infrastructure elements presently in use by context delivery companies and Internet Service Providers (ISPs) to provide fast and reliable delivery of information to users over the Internet. Referring to FIG. 1, a group of users or clients 101-104 are shown at workstations or home computers that are connected to various elements in the Internet 100. Internet 100 includes a plurality of interconnected routers 150-154, and layer 4-7 switches 130-132. The arrangement and capabilities of these elements is well known to those skilled in the art. Examples of level 4 switches are switches in the IPWorX™ WebDirector family available from Lucent Technologies. Examples of layer 7 switches are the switches in the AppSwitch™ 3500 family available from Top Layer Networks. In FIG. 1, client 104 is shown as being connected to Internet 100 via a router 140 within an Intranet 141. This arrangement is meant simply to illustrate that the Internet is not a unitary arrangement, but consists of many interconnected individual networks of elements, some of which are referred to as Intranets or private networks. Likewise, in FIG. 1, a server 120 within an Intranet 122 is shown as being connected to Internet 100 via a firewall 121. Here again, this depiction is illustrative of the fact that content is contained on servers like server 120 within the networks (Intranet 122) of content providers, and that some protection is currently afforded by software arrangements such as firewall 121 which try to block unauthorized access. Server 120 can be the victim of a coordinated denial of service attack that the present invention is designed to prevent.

In order to provide clients with faster access to content, context delivery companies and ISPs have used elements, called web caches, to act as alternate sources of content. In FIG. 1, web cache 160 is connected to switch 132, and web cache 161 is connected to switch 131. If a client, such as client 102 is seeking information from server 120, a TCP packet addressed to server 120 and containing a "HTML" get request" is routed through internet 100 from the client computer toward server 120. The path taken illustratively is via switch 130 to switch 131. If the latter switch is a layer 4-7 switch, it is arranged to decide whether to route a request to server 120, or to a cache 161 connected to the switch, depending upon the identity of the specific file requested. Switch 131 is also arranged to handle TCP termination inside the switch. Note that if switch 131 is a layer 7 switch, the web guard processor functionality could be placed inside the switch, rather than on a separate device coupled to the switch. When switch 131 receives the TCP packet, the destination address is examined, and if a translation entry is found, the packet is routed to web cache 161 rather than to server 120. The TCP connection originated at client 102 is terminated at that cache. Web cache 161 then checks the HTML "get" request to determine if the required context can be delivered from the local cache. If so, the cache just sends the file to the client. Otherwise, the cache opens a new TCP connection to server 120, retrieves the file, and sends it to client 102.

The architecture and arrangement of the context delivery system shown FIG. 1 is meant to be illustrative only, since numerous different methods of connection are currently in use, and other mechanisms, not shown in FIG. 1, are also possible. Elements in the arrangement serve multiple functions; for example, Layer 4-7 switches are used both for routing of packets as well as for load balancing and filtering. The web cache, which is generally an expensive element of the context delivery arrangement, includes both storage capability as well as logic needed to figure out which of the files wanted by clients are stored locally, deliver them, retrieve copies of files which are unavailable locally (or of which the local copy is not updated), deliver them, and decide whether to keep a local copy.

Figure 2:
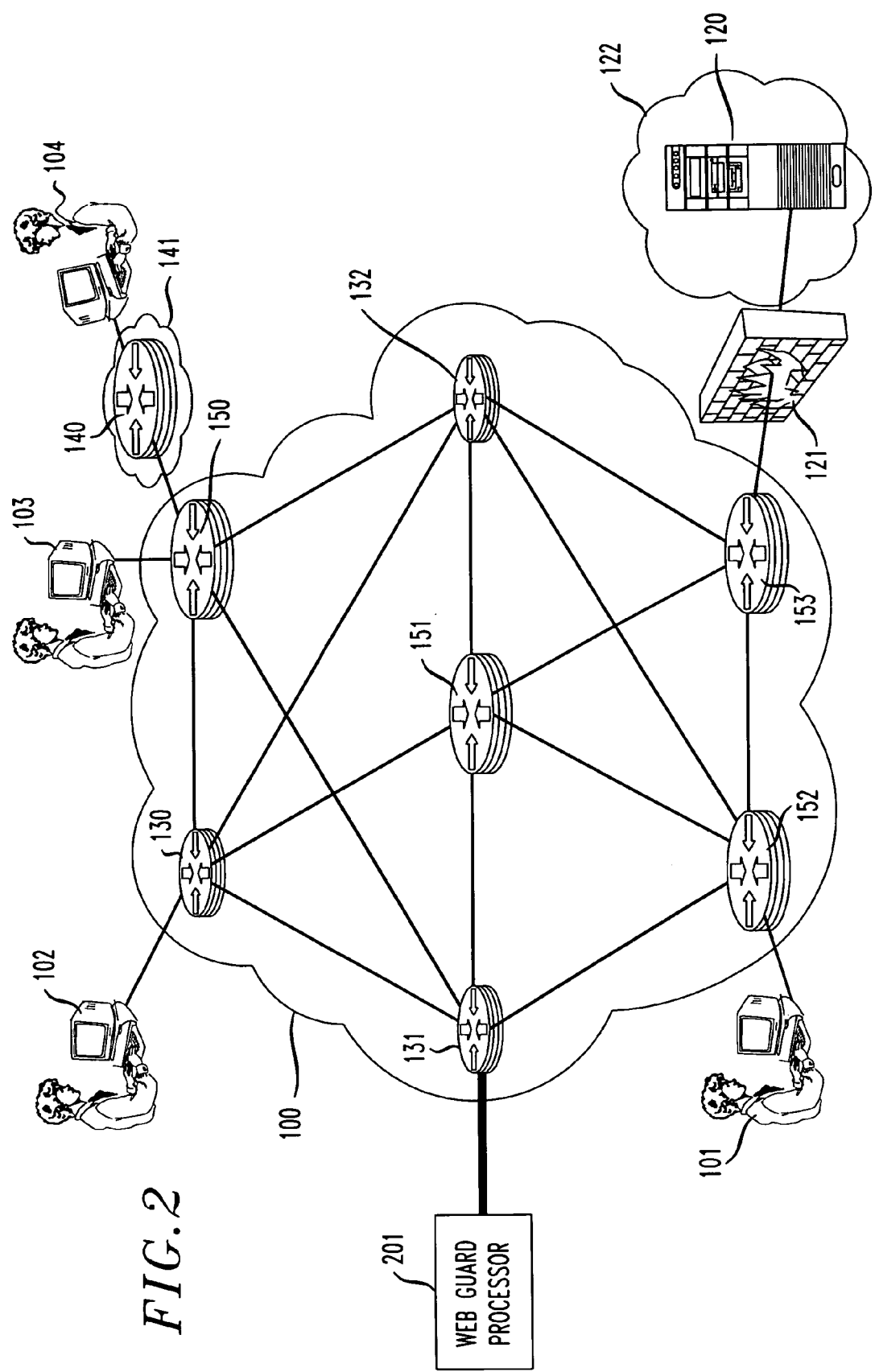
FIG. 2 is a block diagram similar to FIG. 1 showing a web guard processor 201 arranged in accordance with the principles of the present invention to work cooperatively with switch 131.
Figure 3:
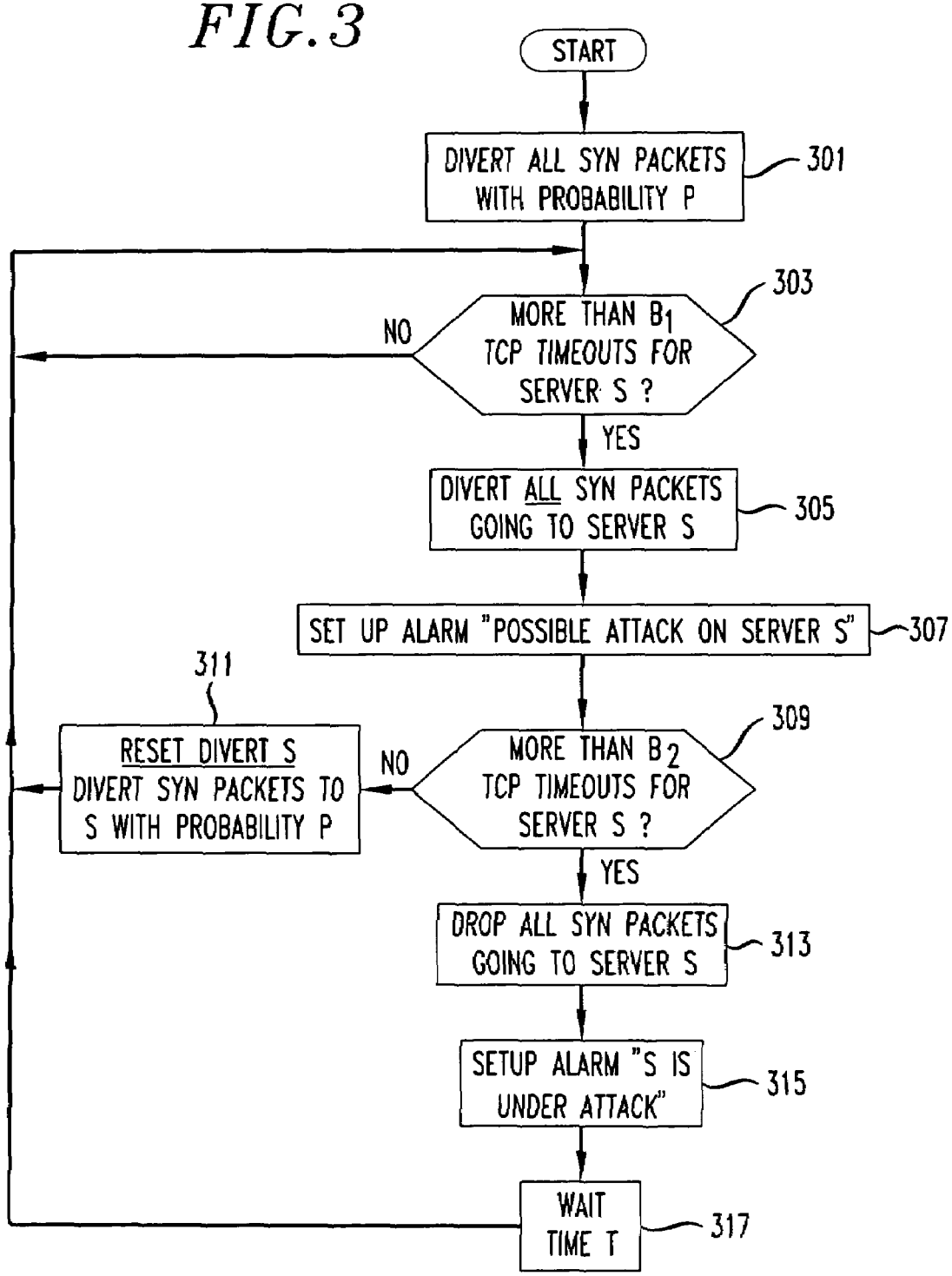
FIG. 3 is a flow diagram of the process performed in web guard processor 201 of FIG. 2.

In accordance with the present invention, the undesirable effects created by CSDoS attacks are eliminated by using the arrangement of FIG. 2, which includes a web guard processor 201 operating in cooperation with a layer 4-7 switch, such as switch 131 in FIG. 2. Web guard processor 201, which includes a processor and memory capabilities, can be an external element, operating cooperatively with a layer 4 switch. Alternatively, web guard processor 201 can be a logical element built into the hardware present in a layer 7 switch. The process performed in the web guard processor is illustrated in flow diagram form in FIG. 3.

During normal operation, i.e., before a CSDoS attack is detected, switch 131 is arranged to divert, in step 301, a predetermined small fraction of the SYN packets destined to each server S, to web guard processor 201. This may be accomplished by establishing a probability P (say P=0.02) with which any given SYN packet destined to server S will be diverted. Web guard processor 201 is arranged to terminate the TCP connection from the client from which the SYN packet originated, and upon the establishment of the two-way TCP connection with the client (through the normal TCP interaction), to open a new TCP connection to the server and to transfer data between these two elements.

Web guard processor 201 also monitors, in step 303, the number of timed out connections from client accessing each server S. When this number increases beyond a first predetermined threshold $B_{1S}$ (say more than 2 in the last minute), a YES result occurs in web guard processor 201 in step 303, which indicates that server S may be under attack. The process then proceeds to step 305, in which switch 131 is reprogrammed to divert all traffic (i.e. SYN packets) destined for server S, to the web guard processor 201: These diverted packets can simply remain in web guard processor 201 without harming the operation of server S; alternatively, web guard processor 201 can be arranged even at this point to reprogram switch 131 to delete all SYN packets destined for server S. However, as explained below in connection with step 309, this drastic action is not usually taken at this point in the process. If desired, an alarm signal can be generated in step 307, indicating that server S is under attack. If the threshold is not reached in step 303, a NO result causes the process to return to and repeat step 303.

The process continues to step 309, in which web guard processor 201 continues to monitor the number of timed out connections to each server S. When this number continues to exceed a second predetermined threshold $B_{2S}$ web guard processor 201, a YES result occurs in step 309, which indicates that server S is indeed under attack. Then in step 313, web guard processor 201 is arranged to reprogram switch 131 to delete all SYN packets destined for server S. In addition, web guard processor 201 can, in step 313, send a message to server S alerting it that an attack is in progress, inform other web guard processors, and try to find the real hosts originating the forged packets. An alarm can then be generated, in step 315, indicating the alarm condition, which continues for a predetermined time T. After expiration of this waiting period in step 317, the process returns to step 303.

If the number of timed out connections does not exceed the second predetermined threshold $B_{2S}$, the result in step 309 is NO, and the process continues to step 311 where a complete packet diversion that was instituted in step 305 is reset. At this point, the switch 301 is directed to again divert only a predetermined small fraction of the SYN packets destined to server S, to web guard processor 201 (same as in step 301). The process then returns to step 303.

From the foregoing description, it is seen that the present invention is premised on the fact that when a CSDoS attack is in progress, the number of the forged attack packets increases significantly, and therefore some of them will most likely be sent to the web guard processor 201. This will result in TCP time-outs, allowing the attack to be detected and then blocked, as explained above.

Another, more basic approach to fighting a CSDoS attack may be used in accordance with another embodiment of the present invention. In this embodiment, the content delivery infrastructure described in FIG. 1, consisting of a network of interconnected layer 4-7 switches, is modified so that web caches 160 and 161 are replaced with a simple network element that only deals with the TCP connections, and does not cache any data locally. We call this element a "TCP-proxy". With this arrangement, which is much more inexpensive to implement than an arrangement using conventional web caches, when a CSDoS attack is in progress, all SYN packets destined for a server having an entry in the layer 4-7 switch associated with TCP proxy are diverted there. However, no connections TCP are established, since the SYN/ACK response packets are sent by the TCP proxy to the forged addresses, which do not respond. Since no TCP connections are established and no "HTML get packet" arrives, no connections are established between the TCP proxy and the server, and the server does not feel the attack. In spite of the fact that the load on the TCP proxy increases, and service to legitimate connections that go through it may degrade, the degradation in the performance of this specific TCP proxy affects only a small fraction of the legitimate users, and packets originating in all other clients using servers in different parts of the network are unaffected.

Various modifications and enhancements of the present invention are possible, and for that reason, the present invention is to be limited only by the following claims. For example, a combination of web guard processors and TCP proxies can be implemented in a single network element. Also, the elements of the present invention can be combined with other context delivery techniques, such as DNS based redirection, in order to maximize the benefits achieved by the present invention. Specifically, DNS based redirection can be used to force packets destined for a particular server to be routed through a web guard processor or to be routed to a switch having an associated TCP proxy.

What is claimed is:

1. A method for thwarting coordinated SYN denial of service (CSDoS) attacks against a server S disposed in a network of interconnected elements communicating using the TCP protocol, comprising the steps of
    controlling a network switch to divert a predetermined fraction of SYN packets destined for said server, to a web guard processor,
    establishing a first TCP connection between one or more clients originating said packets and said web guard processor, and a second TCP connection between said web guard processor and said server, so that packets can be transmitted between said one or more clients and said server,
    monitoring the number of timed-out connections between said web guard processor and said one or more clients, and
    if the number of timed-out connections between said web guard processor and said one or more clients exceeds a first predetermined threshold, controlling said switch to divert all SYN packets destined to said server to said web guard processor.

2. The method of claim 1 further comprising the step of generating an alarm indicating that said server is likely to be under attack.

3. The method of claim 1 including the further steps of
    determining if the number of timed-out connections between said web guard processor and said clients exceeds a second predetermined threshold, and
    if so, controlling said switch to delete all SYN packets destined for said server.

4. The method of claim 3 further comprising the step of generating an alarm indicating that said server is under attack.

5. The method of claim 1 further including the step of notifying said server that it is under attack.

6. The method of claim 1 further including the step of notifying other web guard processors in said network that said server is under attack.

7. A method for thwarting coordinated SYN denial of service (CSDoS) attacks against a server disposed in a network of interconnected elements communicating using the TCP protocol, the attack originating from a host generating SYN packets destined for the server, said method comprising:
    arranging a switch receiving the SYN packets destined to the server to forward the SYN packets to a TCP proxy arranged to operate without an associated cache,
    for each SYN packet, sending a SYN/ACK packet from the TCP proxy to a sender address included in the SYN packet by the host;
    establishing a TCP connection, corresponding to a particular SYN packet of the SYN packets, between the TCP proxy and the server only if the TCP proxy receives a response from the host to the SYN/ACK packet corresponding to the particular SYN packet.

* * * * *